United States Patent [19]
Young

[11] 3,896,182
[45] July 22, 1975

[54] PROCESS FOR PREPARING VINYL CHLORIDE BY THE PYROLYSIS OF 1,2-DICHLORO-ETHANE

[75] Inventor: Donald Peter Young, South Croydon, England

[73] Assignee: BP Chemicals Limited, London, England

[22] Filed: Sept. 27, 1973

[21] Appl. No.: 401,394

Related U.S. Application Data

[63] Continuation of Ser. No. 160,172, July 6, 1971, abandoned.

[52] U.S. Cl. .............................................. 260/656 R
[51] Int. Cl. ............................................ C07c 21/02
[58] Field of Search ................................. 260/656 R

[56] References Cited
UNITED STATES PATENTS

| | | | |
|---|---|---|---|
| 2,569,923 | 10/1951 | Cheney | 260/656 R |
| 2,755,315 | 7/1956 | Eberly | 260/656 R |
| 2,875,255 | 2/1959 | Eberly | 260/656 R |

*Primary Examiner*—D. Horwitz
*Attorney, Agent, or Firm*—Brooks Haidt Haffner & Delahunty

[57] ABSTRACT

Vinyl chloride is produced by heating 1,2-dichloroethane to elevated temperatures in the absence of oxygen or oxygen containing gases.

3 Claims, No Drawings

PROCESS FOR PREPARING VINYL CHLORIDE BY THE PYROLYSIS OF 1,2-DICHLORO-ETHANE

This is a continuation of application Ser. No. 160,172, filed July 6, 1971, and now abandoned.

The present invention relates to a process for the preparation of vinyl-chloride by the dehydrochlorination of 1,2-dichloroethane.

It has been known for some time that vinyl chloride can be produced by the pyrolytic dehydrochlorination of 1,2-dichloroethane. The process involves the passing of 1,2-dichloroethane through a small diameter reaction tube and heating the 1,2-dichloroethane to elevated temperatures to bring about the dehydrochlorination thereof. However, when the pyrolysis is carried out under such conditions solid carbonaceous substances which cause the clogging of reaction tubes tend to be formed as by-products of the decomposition. It is also observed that these solids cause clogging mainly in the part of the tube used to evaporate the 1,2-dichloroethane prior to passing into the later section where pyrolysis actually occurs. When these carbonaceous materials are formed the equipment must be shut down periodically to clean out the reaction tubes thereby preventing the continuous operation of the process for any appreciable length of time. It was thought that a reaction tube of appreciably larger internal diameter would reduce the deposition of carbonaceous materials within the tube itself. However, by using such a tube the heat transfer from the external wall of the tube to the material passing through the very central area thereof would be such that an increased temperature would be required to produce the evaporation and dehydrochlorination of the centrally located material and such a temperature would also cause the material passing close to the walls of the reaction tube to be heated too greatly and to be further decomposed into unwanted by-products. Another technique suggested to retard the formation of these carbonaceous by-products is the filling of the reaction tubes with a non-porous packing material. Even these packed tubes must be removed or mechanically cleaned far too frequently for the process to be considered particularly economical.

According to the present invention vinyl chloride is produced by heating 1,2-dichloroethane to elevated temperatures in the substantial absence of oxygen or oxygen containing gases.

By the term "substantial absence of oxygen" is meant here and throughout the specification that there is no more than 0.5–2.0 ppm of oxygen in the reaction system during pyrolysis. In contrast to this the amount of oxygen usually present in the known art processes vary between 40 and 200 ppm.

The pyrolysis reaction can be carried out in an autoclave or in conventional reaction tubes normally employed in reactors for the pyrolysis of 1,2-dichloroethane. It is observed that by the total exclusion of oxygen or oxygen containing gases from the reaction system little or no carbonaceous deposits are formed in the reaction tubes and thus the clogging of the reaction tubes is minimised.

The pyrolysis of 1,2-dichloroethane according to the present invention may be carried out at temperatures in the range of 250° to 600°C, preferably 450° to 550°C.

Oxygen or oxygen containing gases may be eliminated from the reaction system by flushing the reactor with an inert gas material such as nitrogen before the actual pyrolysis takes place, degassing the 1,2-dichloroethane feed by heating or other suitable means followed by storage in an oxygen free atmosphere.

The pyrolysis reaction may be carried out at sub-atmospheric, atmospheric or super atmospheric pressures. It is however preferred to use super atmospheric pressures.

The process of the present invention may be operated batchwise or continuously. It is however most preferred to operate the process continuously. The advantages of the present invention are illustrated with reference to the following examples.

EXAMPLES 1 – 4

In the following runs which were all conducted in an autoclave, the effect of oxygen on the evaporation 1,2-dichloroethane prior to pyrolysis thereof at temperatures and pressures prevailing in a pyrolysis reactor, was investigated. For this purpose, 100 ml. of 1,2-dichloroethane was heated to 285°C for 2 hours in a closed stainless steel vessel in an atmosphere of nitrogen and in total absence of oxygen of air.

TABLE 1

| Example No. | AIR ABSENT — $N_2$ ATMOSPHERE | | | |
|---|---|---|---|---|
| | % w/w Vinyl chloride formed | % w/w by-products | Coking | Corrosion |
| 1 | 3.2 | 0.1 | + | A |
| 2 | 4.0 | 0.2 | – | A |

+ Black deposit on the base of the autoclave only
– No deposit, or thin brown deposit on base of autoclave only
A No visible metallic salts removed on washing, i.e. no visible corrosion.

In a set of comparative runs, not according to the invention, 100 ml. of 1,2-dichloroethane was heated to 285°C for 2 hours in a closed stainless steel vessel in the presence of 650 ml (N.T.P.) of air.

TABLE II

| Comparative Example No. | IN THE PRESENCE OF AIR | | | |
|---|---|---|---|---|
| | % w/w Vinyl Chloride formed | % w/w by-products | Coking | Corrosion |
| a | 0.5 | 0.2 | ++ | * |
| b | 2.2 | 1.4 | ++ | * |
| c | 3.2 | 1.2 | ++ | * |

++ Black deposit all over the walls of autoclave
* Coloured solution obtained on water-washing autoclave and/or gauze.

EXAMPLE 3

1,2-Dichloroethane (99.96% pure) containing 43 ppm by weight of oxygen was sparged with nitrogen till analysis indicated that the oxygen content had fallen to 0.2 ppm. The dichloroethane was then pumped (20 lb/hr) to a laboratory unit which simulated the vaporisation stage of a commercial pyrolysis unit and was operated under a pressure of 500 psig. This consisted of three four foot lengths of 0.125 in. I.D. stainless steel tubing connected in series, each length being surrounded by an electric furnace. The furnaces were set so that the temperature of the stream between the first and second tubes was 225°C; between the second and third it was 265°C and at the outlet of the third tube it was 349°C. Thus the liquid feed was preheated in the first tube, vaporised in the second tube, and superheated, without cracking it in the first tube. After 5 hours passage of the dichloroethane, the flow was replaced by nitrogen to purge out the tubes. The tube wall temperatures were then raised to a maximum of 600°C and the flow of nitrogen was replaced over ½ hour by one of air (20 l/hour) at atmospheric. This was continued till the concentration of carbon oxides in the exit gas had fallen to a negligible amount. The carbon oxides formed were analysed and gave a manner of the coke deposited in the vaporisation of the measure The whole procedure was repeated with 1,2-dichloroethane containing 43 ppm of oxygen, omitting the oxygen removal step. It was found that removal of oxygen from the feed had reduced the coke deposition by 22.2 percent.

It can be seen from the above results that heating 1,2-dichloroethane in an atmosphere from which oxygen has been excluded results in a considerable reduction in the formation of carbonaceous products and coking.

I claim:

1. A process for the production of vinyl chloride comprising substantially removing oxygen from 1,2-dichloroethane and the reaction system so that said reaction system contains no more than 2.0 parts per million of oxygen and pyrolysing said 1,2-dichloroethane at elevated temperatures in the range of about 250° to 600°C.

2. A process according to claim 1 wherein the pyrolysis is carried out at a temperature in the range of 450° to 550°C.

3. A process according to claim 1 wherein the pyrolysis is carried out in a continuous manner.

* * * * *

UNITED STATES PATENT OFFICE
CERTIFICATE OF CORRECTION

PATENT NO. : 3,896,182
DATED : July 22, 1975
INVENTOR(S) : DONALD PETER YOUNG

It is certified that error appears in the above-identified patent and that said Letters Patent are hereby corrected as shown below:

Col. 3, line 11, "manner" should read --measure--

Col. 3, line 12, "measure" should read --dichloroethane--

Signed and Sealed this twentieth Day of January 1976

[SEAL]

Attest:

RUTH C. MASON
Attesting Officer

C. MARSHALL DANN
Commissioner of Patents and Trademarks